United States Patent [19]

Yair

[11] Patent Number: 4,964,603
[45] Date of Patent: Oct. 23, 1990

[54] MOUNTING

[75] Inventor: John Yair, Worcestershire, Great Britain

[73] Assignee: Imbiex (Monmouth) Limited, Cwmbran, United Kingdom

[21] Appl. No.: 228,920
[22] PCT Filed: Feb. 16, 1987
[86] PCT No.: PCT/GB87/00110
    § 371 Date: Aug. 2, 1988
    § 102(e) Date: Aug. 2, 1988
[87] PCT Pub. No.: WO87/05082
    PCT Pub. Date: Aug. 27, 1987

[30] Foreign Application Priority Data

Feb. 19, 1986 [GB] United Kingdom ............. 8604100

[51] Int. Cl.⁵ ..................................... A47B 96/06
[52] U.S. Cl. ............................. 248/230; 248/278
[58] Field of Search .............. 248/229, 230, 231.6, 248/316.6, 278, 223.3, 224.3, 224.4, 278; 362/418, 419

[56] References Cited

U.S. PATENT DOCUMENTS

| | | | |
|---|---|---|---|
| 567,157 | 9/1896 | Noyes | 248/229 |
| 980,742 | 1/1911 | Bartholomew | 248/229 |
| 1,520,894 | 12/1924 | Thomas | 248/278 |
| 1,580,316 | 4/1926 | Moreton | 248/278 |
| 1,631,355 | 6/1927 | Baldwin | 248/229 X |
| 1,676,124 | 7/1928 | Wilkie | 248/231.6 |
| 1,735,212 | 11/1929 | Pawsat | 248/229 |
| 1,840,768 | 1/1932 | Doane | 248/278 |
| 2,063,924 | 12/1936 | Hanko | 248/229 |
| 2,388,474 | 12/1945 | Ellis | 248/278 |
| 2,596,020 | 5/1952 | Fletcher et al. | 248/229 X |
| 2,689,995 | 9/1954 | Smith | 248/230 UX |
| 3,784,140 | 1/1974 | Auerbach | 248/230 X |

Primary Examiner—J. Franklin Foss
Attorney, Agent, or Firm—Young & Thompson

[57] ABSTRACT

This invention relates to mountings for attaching an article to a generally cylindrical support, and in particular but not exclusively for a mounting to attach a bicycle lamp to a bicycle. The mounting 10 comprises an article support 11, an adjustable attachment member 12, a main body 13, a clamp member or strap 14, a bolt pad 15, a bolt 16 and a wing nut 17. The main body 13 and clamp strap 14 are held together by a bolt 16 which enables the clamp strap to be tightened so that a support can be trapped in a recess 24 in the main body 13. Couplings 34 and 37 are provided between the article support 11 and the main body 13 to provide rotational degrees of freedom about two orthogonal axis.

3 Claims, 2 Drawing Sheets

MOUNTING

This invention relates to mountings for attaching an article to a generally cylindrical support, and in particular but not exclusively to a mounting for attaching a bicycle lamp to a bicycle.

There are many different types of mounting for attaching articles to cylindrical supports, but for the most part they are either severely limited in the range of diameters which they can accommodate, do not grip the support sufficiently tightly for many purposes or are insufficiently rigid. One area where special difficulties are encountered is in the mounting of bicycle lamps (or other attachments) to bicycles. To date most mountings have only been able to accommodate to small range of handlebars or frame sizes, and there have, therefore, had to be separate mountings for front and rear lights. In addition for safety reasons the British standards are being continually updated to require a very firm grip so that the lamp cannot be dislodged from its set position during travel. Similar problems are encountered when mounting instruments on hand gliders.

One object of the invention is to provide an improved mounting which overcomes some or all of these difficulties.

From one aspect the invention consists in a mounting for attaching an article to a generally cylindrical support comprising a main body defining a recess for receiving the support, means for supporting the article on the main body, a clamp member movable relative to the main body and means urging the clamp member and the body together such that a portion of the clamp member extends into the recess to clamp the support in the recess.

Preferably the portion is formed such that the clamping force will act essentially radially on the support and additionally, or alternatively, it is formed such that the engagement with the support will be along a long or narrow elongate surface.

The mounting may further include a resilient element mounted in the recess for conforming to or engaging a surface of the support when the support is clamped in the recess. The recess may be generally triangular in section.

The urging means may include a threaded bolt, extending through the clamped member and the main body, and a nut, so that the clamp member and the body may be held between the head of the bolt and the nut. Preferably the bolt head is held captive relative to the clamp member and the clamp member may be formed with an elongate slot through which the bolt passes to allow lateral movement of the clamp member relative to the bolt.

The support means may include means for holding the article and a first coupling for allowing rotation of the holding means about a first axis. In a preferred embodiment the support means also includes a second coupling for allowing rotation of the holding means about a second axis lying at an angle to the first axis, for example they may be orthogonal. Each coupling may be lockable, for example, the first coupling may be lockable in a selected rotational position by the clamp member. Conveniently one or both of the couplings may be constituted by circular couplings.

As mentioned previously the support means may include means for holding the article, and in a preferred embodiment this is in the form of a spade. The spade may be keyed.

The invention also includes a bicycle lamp in combination with a mounting as defined above.

From another aspect the invention consists in a mounting for attaching a bicycle lamp to the bicycle having a spade for supporting the lamp and coupling for providing two rotational degrees of freedom for the spade.

Although the invention has been defined above, it is to be understood that it includes any inventive combination of the features set out above or in the following description. The invention is not necessarily limited to mountings, lenses or reflectors which achieve the stated objects.

The invention may be performed in various ways, and specific embodiments will now be described, by way of example, with reference to the accompanying drawings in which.

Figure 1:
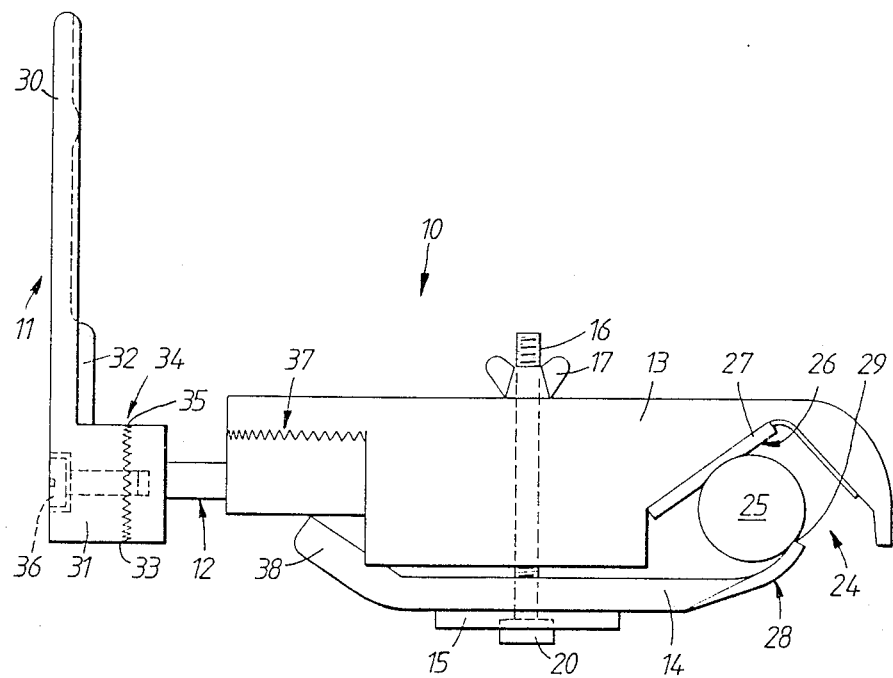
FIG. 1 is a side view of a mounting.

In FIG. 1 a mounting is generally indicated at 10. For the purpose of this specification the mounting will be described in terms of a mounting for a bicycle lamp 40, but it could have a wide range of uses simply by altering the kind of support that it provides. For example, it could be used for attaching instruments to hang gliders.

The mounting 10 comprises an article support 11, an ajustable attachment member 12, a main body 13, a clamp member or strap 14, a bolt pad 15, a bolt 16 and a wing nut 17.

Figure 2:
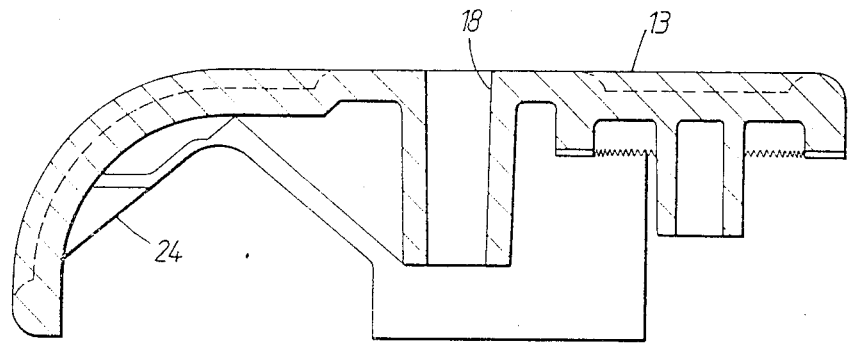
FIG. 2 is a longitudinal section (from the other side) through the main body of the mounting of FIG. 1.
Figure 3:
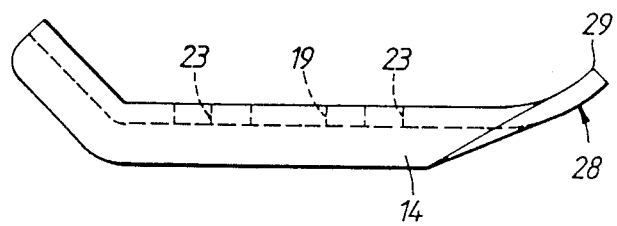
FIG. 3 is a side view of a clamp plate of the mounting of FIG. 1.
Figure 4:
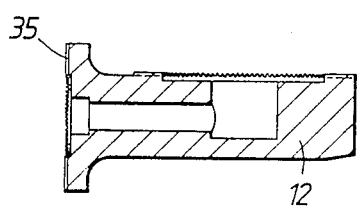
FIG. 4 is a longitudinal sectional view of an adjustable support of the mounting of FIG. 1.
Figure 5:
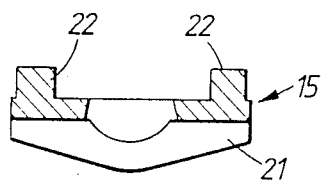
FIG. 5 is a longitudinal part-sectional view of a bolt pad of the mounting of FIG. 1.

The main body 13 and clamp strap 14 are held together by the bolt 16 which passes through respective holes 18, 19 (see FIGS. 2 and 3). The hole 18 is approximately the same size as the bolt but the hole 19 is elongate in a longitudinal direction to allow longitudinal movement of the strap 14 relative to the main body 13. The head of the bolt 20 is held captive between the walls 21 of the bolt pad 15, which is itself fixed with respect to the clamp strap 14 by means of its upward projections 22 which locate in locating apertures 23 in the strap 14.

Thus, when the wing nut is tightened, the clamp strap is drawn upwardly towards the body but is capable of longitudinal movement relative thereto until it becomes gripped between the bolt pad and the main body 13.

The main body 13 defines a large triangular-section downwardly-facing recess 24 for receiving the generally cylindrical support 25 to which the mounting is to be attached. The inner inclined side 26 of the recess 24 is defined by a resiliant pad 27 which both frictionally engages the support 25 and also conforms to the shape thereof.

The clamp member 14 has an upwardly curved end 28 which projects into the recess 24 to engage the support 25 along its upper most edge 29. The arrangement is such that when the nut is tightened and the clamp strap 14 is lifted the edge 29 engages the support 25 forcing it into the pad 27 until it is tightly clamped therein. Because the contact between the clamp strap 14 and the support 25 is essentially a line contact the force will pass generally radially through the support 25 thus providing the most effective clamping force. In addition the line contact means that the clamp strap is not limited to any particular size of support but can engage a whole range of sizes.

The versatility of the mounting is further enhanced by the use of a resiliant pad 27 which can take up the shape of a very wide range of sizes and grip them effectively. Thus the mounting 10 can be attached to almost any cylindrical part of a bicycle from sizes ranging up from the spokes to the handlebars. This means that only one mounting is required for both rear and front lights as opposed to the two quite separate arrangements typically used at present.

As can be seen in FIG. 1 the article support 11 is essentially in the form of a spade which has a blade 30 and an enlarged end 31. The blade carries a raised key 32 to ensure secure attachment of lights thereto. The enlarged end 31 has a rear face 33 formed with a pattern of radiating ridges and grooves which constitute one half of a circular coupling 34. The other half of the coupling 34 is constituted by a similarly formed face 35 on the adjustable attachment member 12 and it will be appreciated that the coupling 34 enables the spade to be positively located in stepped positions around 360°, relative to the longitudinal axis of the main body 13. The selected position can be locked by tightening the screw 36 which passes through the enlarged end 31 into the attachment member 12.

A further circular coupling is formed between the attachment member 12 and the main body 13 as indicated at 37. The coupling 37 provides rotational adjustment about an axis orthogonal to the adjustment axis of the first coupling 34, and allows somewhere between 180° and 270° of movement. It will be noted that clamp member 14 is formed with an upwardly projecting tail 38 which clamps the coupling 37 into its selected position.

It will be readily appreciated that the two degrees of rotational freedom provided by the two couplings 34 and 37 enable the blade 30 to take up a wide range of orientations. Thus whatever the angle of the support 25 that is selected the blade can be repositioned until it is vertical and facing longitudinally when the bike is held in an upright position.

When the support 25 is of small diameter gripping may be enhanced by reversing the strap 14 such that tail 38 engages the support 25, whilst end 28 clamps coupling 37.

I claim:

1. A mounting for attaching an article to a generally cylindrical support comprising, a main body defining a recess for receiving a support, means for supporting the article on the main body, a clamp member movable relative to the body and having a projecting portion for engaging the support to retain the support in the recess, means for urging the clamp member and the body together such that the portion of the clamp member extends into the recess to clamp the support in the recess, said supporting means including means for holding the article, a coupling for allowing rotation of the holding means about an axis, and means for locking the coupling in a selected rotational position, said locking means including the clamp member.

2. A mounting for attaching an article to a generally cylindrical support comprising a main body defining a recess for receiving the support, means for supporting the article on the main body including means for holding the article and including a first coupling for allowing rotation for the holding means about a first axis, means for locking the first coupling in a selected rotational position, a clamp member movable relative to the main body and having a projecting portion for engaging the support, the clamp member including the means for locking the first coupling in the selected rotational position and means for urging the clamp member and the body together such that the portion of the clamp member extends into the recess to clamp the support in the recess.

3. In combination with a generally cylindrical portion of a bicycle, a mounting for attaching a bicycle light to said cylindrical portion, said mounting comprising a main body defining a recess having a pair of divergent surfaces, said cylindrical portion being disposed in said recess, a resilient element extending over one of said surfaces, said cylindrical portion being in contact with said resilient element and being spaced from the other of said surfaces, a clamp member movable relative to the main body and having cranked projecting means engaging said cylindrical portion to retain said cylindrical portion within the recess, said cranked projecting means and said resilient element diametrically oppositely contacting said cylindrical portion, and means urging the clamp member and the body together to clamp said cylindrical portion between said projecting means and said resilient element.

* * * * *